Aug. 10, 1965  R. CALAMIA  3,199,832

PIVOTED SHUT-OFF VALVE FOR SPRAY GUN

Filed Sept. 1, 1961

INVENTOR.
ROCCO CALAMIA

BY Fulwider, Mattingly
and Huntley
ATTORNEYS 3,199,832
PIVOTED SHUT-OFF VALVE FOR SPRAY GUN
Rocco Calamia, 3685 Mt. Alvarez, San Diego, Calif.
Filed Sept. 1, 1961, Ser. No. 135,620
3 Claims. (Cl. 251—152)

The present invention relates to a valve assembly including a valve and a gasket and also to a combination coupling and shut-off valve.

The valve assembly of the present invention comprises an endless gasket, preferably in the form of a gasket for a hose coupling. A diaphragm is aligned with the interior of the gasket and is preferably surrounded by the gasket. A stem is attached to the diaphragm and extends through the gasket. The outer end of the stem is provided with a handle section for manipulating the diaphragm by rotating the stem about its longitudinal axis.

In the preferred embodiment of the invention, the stem extends through a hole in the gasket and through a hollow boss formed integrally with the gasket. Leakage is prevented at the hole because the stem is closely embraced by the interior wall of the hollow boss.

In another aspect of the invention, it also comprises a combination coupling and shut-off valve. The combination includes a main or coupling body having a fluid passage therethrough and forming a seat for a gasket, which seat preferably surrounds the fluid passage. The endless gasket is compressed against the seat, preferably and usually by another coupling such as the male coupling of a hose. The main or coupling body, aforementioned, is provided with an opening therethrough, which opening extends outwardly of the gasket. The diaphragm of the valve assembly is disposed so that it can cover the fluid passage in the main coupling body. The stem is attached to the diaphragm for moving the same. This stem extends through the gasket and the forementioned opening in the coupling, and is provided with a handle section exteriorly of the coupling for manipulating the diaphragm as aforesaid.

The integrally formed hollow boss extends through the opening in the coupling and is closely embraced by the wall forming such opening and the boss closely embraces the stem whereby leakage is prevented about the boss and about the stem.

In the preferred embodiment the fluid passage is formed by an inwardly extending nipple and the gasket surrounds this nipple and also surrounds the diaphragm.

The advantages will be apparent from the following description, reference being had to the accompanying drawings wherein a preferred embodiment of the invention is illustrated.

Figure 1:
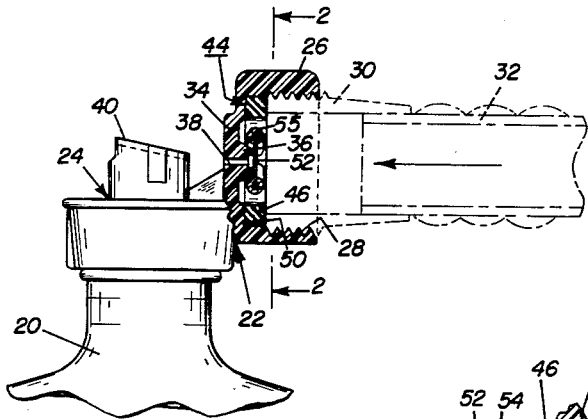
FIG. 1 is a view in elevation of the upper part of a container having an aspirator head thereon and showing in cross section a coupling which is preferably formed integrally with the aspirator head and showing in section the improved valve assembly.

Referring more in detail to the drawing, a dispenser bottle for insecticide or the like is shown at 20. Such bottles are usually threaded for receiving the aspirator head and coupling combination 22, the aspirator head being shown at 24 and the coupling at 26. As previously stated, the aspirator head and the coupling are formed as an integral structure and preferably of a thermosetting plastic. The coupling 26 is herein shown as internally threaded as at 28, for the coupling 30 of, for example, a garden hose 32. The coupling 30 and the garden hose 32 are shown in phantom in FIG. 1. The outer wall 34, shown as a left wall in FIG. 1 of the coupling 26, is provided with an inwardly extending nipple 36, the passage 38 thereof being aligned to direct water over the top surface 40 of the aspirator head 24.

The valve assembly 44 comprises an elastic washer or gasket 46 in the form of an annulus and is similar to the common type employed in connection with the garden hose, except that it is provided with an outwardly extending hollow boss 48. This gasket 46 is adapted to be compressed against a seat 50 on the inner side of the outer wall 34 of the coupling 26, it being compressed when the coupling 30 is screwed in position. This gasket 46 is aligned with the passage 38 of the nipple 36 and surrounds the nipple 36.

Figure 4:
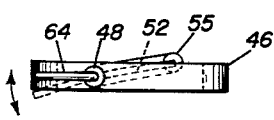
FIG. 4 is a side view of the valve assembly looking in the directions of arrows 4—4 of FIG. 3.

The valve assembly also includes a diaphragm 52 formed of elastic material, as for example rubber. The periphery of this diaphragm is molded about a frame having a circular section 54 through integrally molded rubber sections 55. The diaphragm 52 is shown as functioning as a shut-off valve for the prevention of fluid through a hole 58 in the gasket proper. The diaphragm is adapted to be titled, as shown in FIG. 4, from the hole closing position. The frame also includes an integrally formed stem which extends through an opening 60 in the coupling 26, which hole is aligned with the opening 58 in the gasket 46. The outer end of the stem 56 forms a handle section 62 and is herein shown as provided with a right angle bend portion 64 whereby the stem can be turned about its horizontal axis, as shown in FIG. 4. In turning this stem the diaphragm 52 is moved to provide intercommunication between the interior of the coupling and the passage 38.

In operation, the diaphragm 52 is normally biased to a closed position. By turning the stem 58, the diaphragm valve 52 is lifted from its seat whereby fluid can pass through the passage 38 and have aspirating effect when passing over the top surface 40 of the aspirator head 24.

The outer peripheral surface of the boss 48 is closely embraced by the wall forming the opening 58 so as to assist in preventing the escape of fluid about the boss 48. Also, when the coupling is coupled with a male coupling, the peripheral surface of the washer or gasket is pressed into engagement with the inner wall 66 of the coupling 26 as is more clearly shown in FIG. 6. Thus further assists in preventing the escape of fluid at the opening 58 in the coupling.

Under certain conditions it is desirable to further seal the opening 58 in the housing. Therefore, there has been provided a bead 68 or annulus at the outer end of the boss 48, which, being elastic is in sealing relationship with the outer surface of coupling 26 immediately about the opening 58.

Should there be a slight leakage about the stem 58 at the opening 58 in the gasket due to distorting of the elastic when compressed by coupling 30, leakage about the stem to the exterior of the coupling 26 is prevented since the interior wall of the hollow boss is in sealing relationship with the stem.

Figure 6:
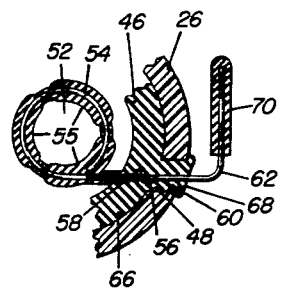
FIG. 6 is a fragmentary sectional view taken along line 6—6 of FIG. 1 but on a larger scale.
Figure 2:
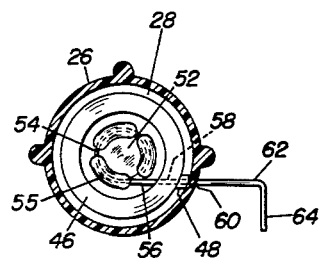
FIG. 2 is a fragmentary view looking in the direction of arrows 2—2 of FIG. 1.
Figure 5:
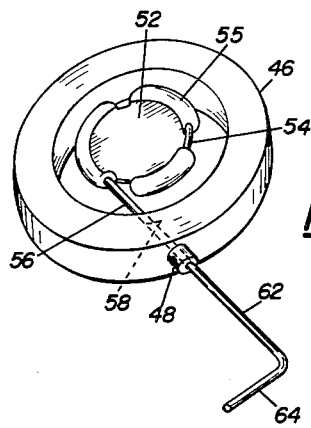
FIG. 5 is a perspective view of the valve assembly.
Figure 3:
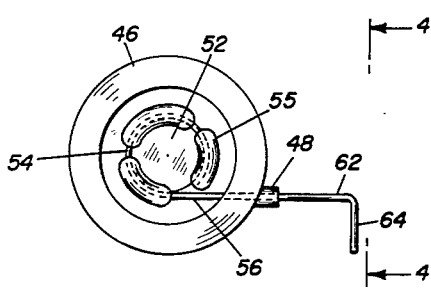
FIG. 3 is a view of the valve assembly shown in FIGS. 1 and 2 but on a somewhat larger scale.

The handle in the preferred embodiment is surrounded by rubber or synthetic rubber as shown at 70 in FIG. 6. Preferably all of the rubber or synthetic rubber of the valve assembly, namely that part 70 on the handle portion 64, the diaphragm 52 and the connecting sections 55, are molded simultaneously onto the frame section 54 and handle portion 64. After this molding operation, the handle section is then inserted through the opening 58 in the gasket from the interior of the gasket, the gasket being sufficiently elastic to receive the handle 70 and, as previously stated, it is sufficiently elastic to thereafter provide a seal about the stem 56.

It will be observed that, preferably, the diameter of the handle 70 is slightly less than the diameter of the hole 60 in the coupling so that it can be pushed through the hole 60 when the valve assembly is coupled with the coupling 26. Also, the bead 68 and boss 48 are sufficiently elastic so that the bead can be pushed through the opening 60. However, after the bead 68 is pushed through the opening 60, it expands and closely embraces the area immediately adjacent the outer end of hole 60 for the purpose previously set forth.

From the foregoing it will be seen that there has been provided a simple and inexpensive valve assembly. Although the valve assembly is simple and inexpensive, yet by virtue of the present invention the valve can be actuated from the exterior of the couplings and while under pressure, and, although under pressure, no leakage can occur since the stem is sealed by the gasket and the integral boss of the gasket.

While the form of embodiment herein shown and described constitutes a preferred form, it is to be understood that other forms may be adopted falling within the scope of the claims that follow.

I claim:

1. A combination coupling and shut-off valve, comprising a coupling body having a passage therethrough and forming a surrounding seat for a gasket; an endless elastic gasket on said seat and defining an opening aligned with the passage, said gasket having a hollow boss formed integrally therewith and extending from the periphery thereof, said coupling having an opening therethrough, the periphery of said boss being in sealing relationship with the wall of said opening; an elastic diaphragm aligned with the passage in said coupling and forming a valve for controlling the flow of fluid through said passage; and a rotatable stem attached to the diaphragm and extending through said gasket and hollow boss, the periphery of said stem being in sealing relationship with the interior wall of said hollow boss, said stem having a handle section disposed exteriorly of the coupling for rotating the stem about its longitudinal axis where it extends through the gasket.

2. A combination coupling and shut-off valve as defined in claim 1, in which the outer end of the hollow boss is provided with a bead in sealing relationship with the outer surface of said coupling.

3. A combination coupling and shut-off valve, comprising a coupling body having an inwardly extending structure which relative to the interior of the coupling is a nipple and forming a surrounding seat for a gasket; an endless elastic gasket on said seat and defining an opening aligned with the passage, said gasket having a hollow boss formed integrally therewith and extending from the periphery thereof, said coupling having an opening therethrough, the periphery of said boss being in sealing relationship with the wall of said opening; an elastic diaphragm aligned with the passage in said nipple and forming a valve for controlling the flow of fluid through said passage; and a rotatable stem attached to the diaphragm and extending through said gasket and hollow boss, the periphery of said stem being in sealing relationship with the interior wall of said hollow boss, said stem having a handle section disposed exteriorly of the coupling for rotating the stem about its longitudinal axis where it extends through the gasket.

References Cited by the Examiner

UNITED STATES PATENTS

| 2,772,850 | 12/56 | Eaton | 251—306 |
| 2,809,800 | 10/57 | Ahl | 251—335 XR |
| 2,912,218 | 11/59 | Stillwagon | 251—306 |
| 3,027,097 | 3/62 | Gleason et al. | 251—298 XR |
| 3,103,712 | 9/63 | Zilk | 251—298 |

ISADOR WEIL, *Primary Examiner.*

M. CARY NELSON, *Examiner.*